US006292186B1

(12) United States Patent
Lehman et al.

(10) Patent No.: US 6,292,186 B1
(45) Date of Patent: Sep. 18, 2001

(54) UNIVERSAL INFORMATION APPLIANCE WITH PARSER

(75) Inventors: Tobin J. Lehman, Los Gatos, CA (US); Kevin Francis Eustice, Savage, MN (US); Armando Gil Morales, Zapopan Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,377

(22) Filed: Nov. 6, 1998

(51) Int. Cl.[7] ........................................... G06F 3/00
(52) U.S. Cl. ................ 345/335; 345/329; 345/333; 345/339; 709/201; 709/328
(58) Field of Search .................... 345/326, 329, 345/333, 335, 339; 709/201, 213, 312, 323, 328

(56) References Cited

U.S. PATENT DOCUMENTS

| | | | |
|---|---|---|---|
| 5,867,153 | * 2/1999 | Grandcolas et al. | 345/326 |
| 5,905,908 | * 5/1999 | Wagner | 709/203 |
| 6,084,584 | * 7/2000 | Nahi et al. | 345/329 |

FOREIGN PATENT DOCUMENTS

| | | | |
|---|---|---|---|
| 949571 | * 10/1999 | (EP) | G06F/17/22 |

OTHER PUBLICATIONS

R. T. Franzo, "Personal appliance system and ASIC architecture," IEEE, p. 428, Sep. 1994.*
W. R. Smith, "The Newton application architecture, " IEEE, p. 156–161, Mar. 1994.*
S. Acharya et al., "the computational requirements of mobile machines," IEEE, p. 314–321, Sep. 1994.*
"Dynamic Control of Intelligent Agent Rules," IBM, p. 541–542, Apr. 1995.*
"Rule–Based Dynamic Personal Variables," IBM, p. 539–541, Nov. 1994.*
"Installing New Devices into the Multimedia Media Presentation Manager/2 System without Writing a Line of Code," IBM, p. 157–163, Dec. 1995.*
"Method of Rule–Based File, Window, and Message Processing," IBM, p. 45–46, Sep. 1994.*
Publication: The T Spaces Vision. "What is T Spaces?" 3 pp. IBM Almaden Research Center. San Jose, CA. Printed from the Web Oct. 22, 1998.
Publication: The T Spaces Vision. "T Spaces: The Next Wave" Lehman et al. 1–13 pgs. IBM Almaden Research Center. San Jose, CA. Printed from the Web Oct. 22, 1998.
Publication: "Integrating Satellite Forms™ with Enterprise Data Using the ActiveX Control." Puma Technology, Inc. White paper. 1–11 pgs. Printed from the Web Oct. 22, 1998.
Publication: "RFS: A Mobile–Transparent File System for the Rover Toolkit." Joseph et al. 2 pgs. M.I.T. Laboratory for Computer Science, Cambridge, MA. Printed from the Web Oct. 22, 1998.
Publication: "PalmPilot Dynamic UI Construction." Desrosiers, Gary T. 11 pgs. Printed from the Web Oct. 22, 1998.
Publication: "Satellite Forms. Enabling Enterprise Solutions For Palm Computing Handhelds." Puma Technology, Inc. 3 pgs. Printed from the Web Oct. 22, 1998.

(List continued on next page.)

*Primary Examiner*—Raymond J. Bayerl
*Assistant Examiner*—X. L. Bautista
(74) *Attorney, Agent, or Firm*—John L. Rogitz

(57) ABSTRACT

A universal information appliance (UIA) such as can be embodied by a personal digital assistant (PDA) can receive an application written in a new "MoDAL" language, parse the application to divide it into binary-formatted GUI elements, and then dynamically render a GUI interface on the display of the UIA based on the GUI elements parsed out of the application. The user can further modify the GUI and save it. With this combination, a GUI can be easily and dynamically tailored for a wide range of user needs, including the needs of handicapped users. The UIA communicates data in an onboard data cache with globally shared, associatively addressed memory spaces such as "TSpaces".

22 Claims, 5 Drawing Sheets

SPECIFIC ARCHITECTURE

OTHER PUBLICATIONS

Publication: "IBM T Spaces Programmer's Guide. Introduction" 15 pgs. IBM Almaden Research Center. San Jose, CA. Printed from the Web Oct. 22, 1998.

Publication: "IBM T Spaces User's Guide. Overview" 8 pgs. IBM Almaden Research Center. San Jose, CA. Printed from the Web Oct. 22, 1998.

* cited by examiner

GENERAL ARCHITECTURE
OF UIA MODULE

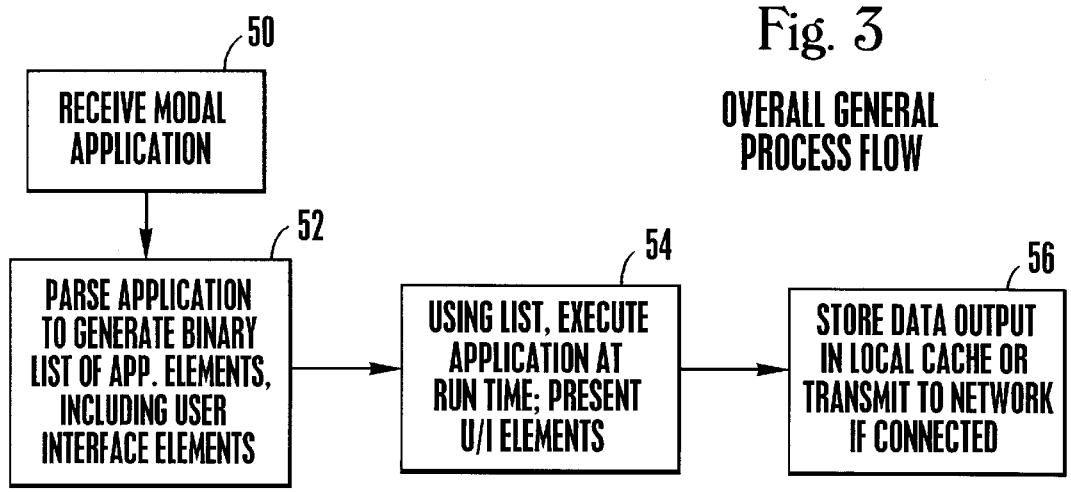
Fig. 3 OVERALL GENERAL PROCESS FLOW
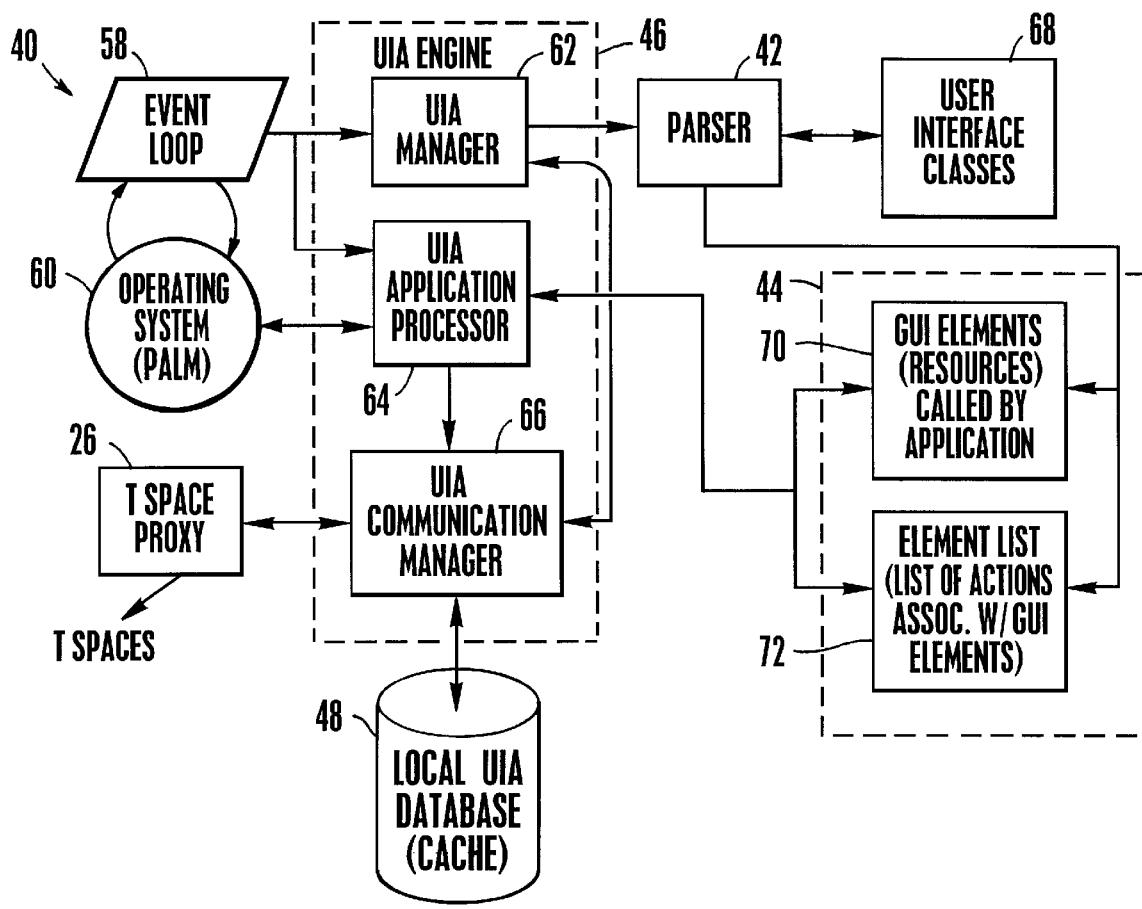
Fig. 4 SPECIFIC ARCHITECTURE

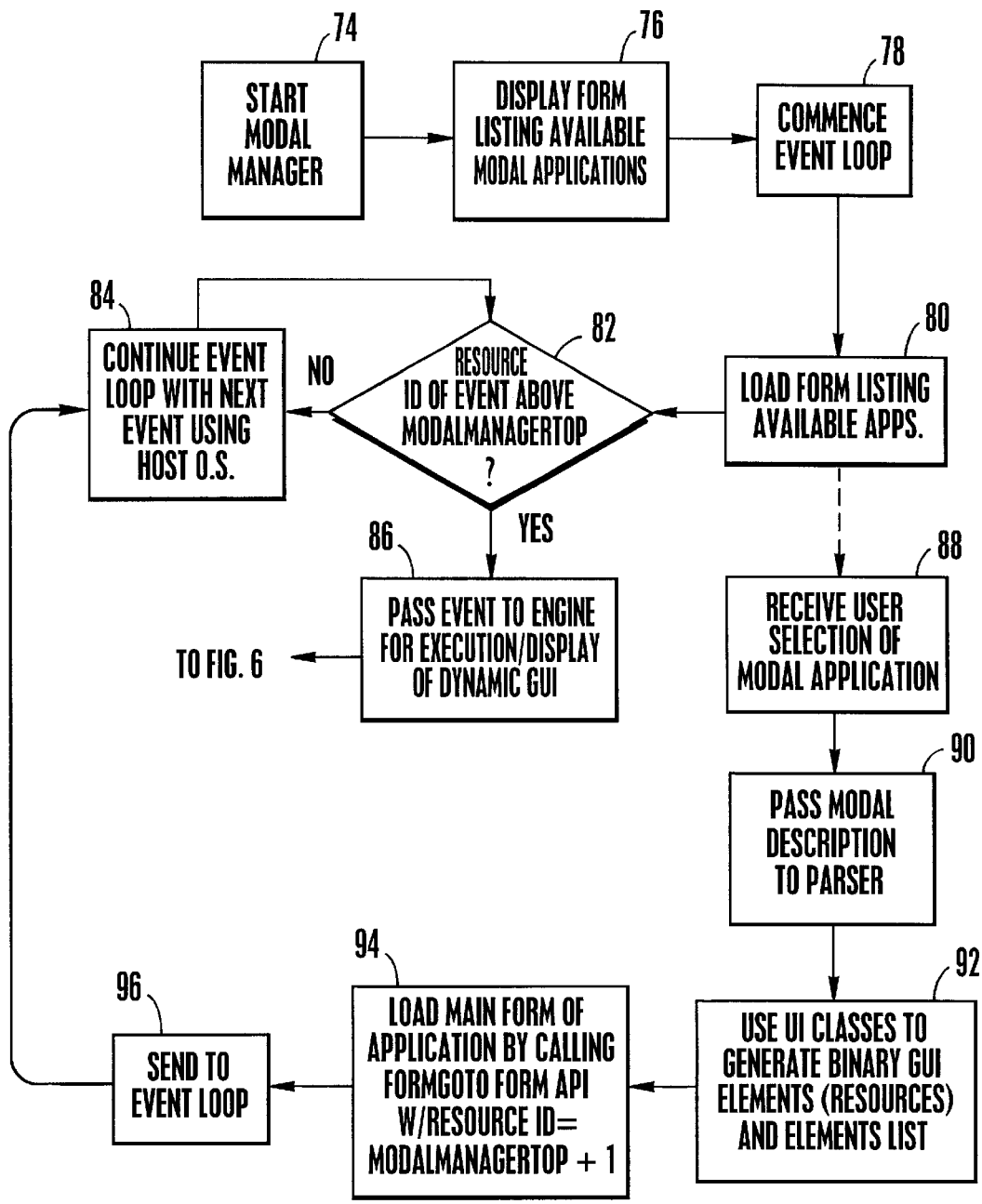

DETAILED FLOW (CONTINUED)

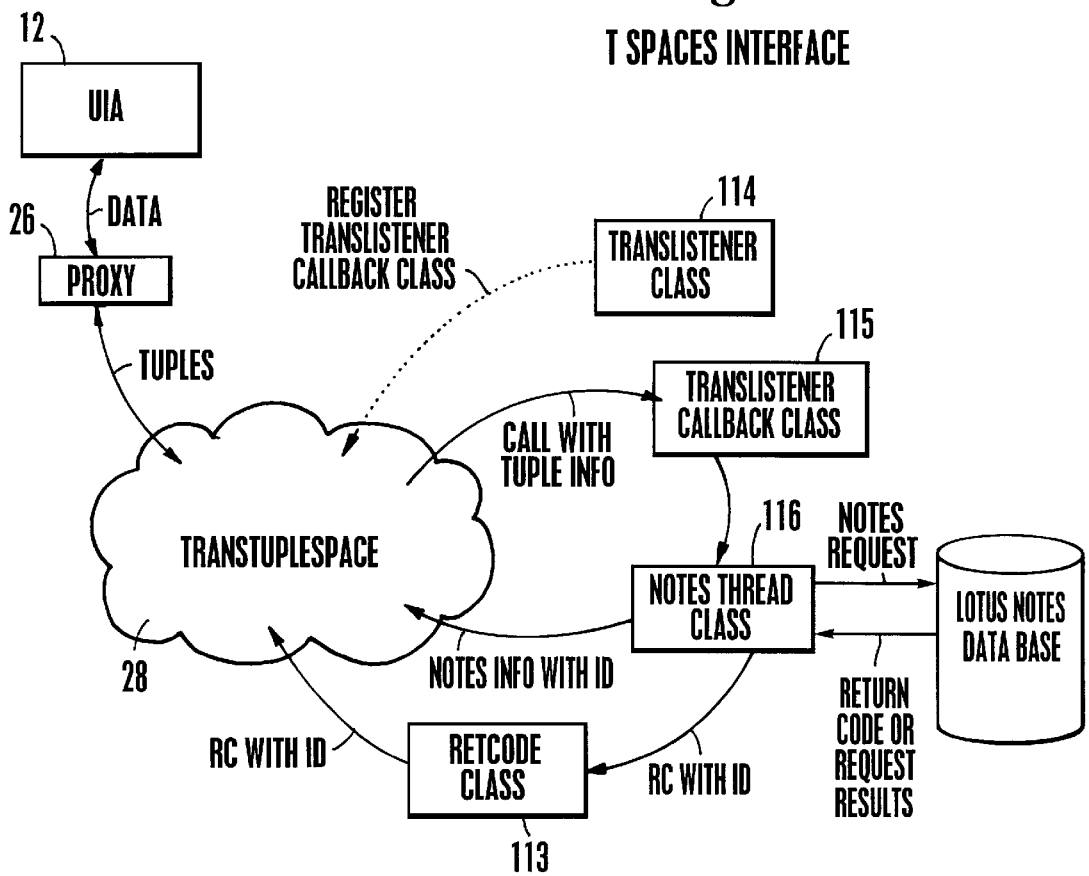

UNIVERSAL INFORMATION APPLIANCE WITH PARSER

BACKGROUND OF THE INVENTION

1. Field of the Invention

The present invention relates generally to pervasive computing devices, and more particularly to information appliances that can be networked with a variety of other information appliances.

2. Description of the Related Art

Information appliances, that is, devices that incorporate digital processors to collect, store, and disseminate information, including information appliances known as personal digital assistants (PDAs), are becoming ubiquitous. Many information appliances can be networked locally. For example, the televisions, computer-controlled kitchen appliances, and security system of a house might all be networked to a central computer, and furthermore the information appliances of the local network might be remotely controllable by means of a PDA that communicates with the local network via the Internet or other system, such as the network referred to as "TSpaces" disclosed in IBM's co-pending U.S. patent application Ser. No. 09/013,768, filed Jan. 27, 1998 and Ser. No. 09/013,505, also filed Jan. 27, 1998, both of which are incorporated herein by reference.

As recognized by the present invention, if a wide variety of information appliances are to share data, the data must be rendered in a form that all appliances can recognize. Furthermore, the present invention recognizes that a "window" into such an electronic world can be conveniently provided by a PDA, owing to the compactness, easy portability, data storage, and program execution capability of PDAs. Indeed, the use of hand held information appliances such as PDAs can be expected to continue to grow as the operating systems for the devices, e.g., Palm Operating System, Windows CE, etc., continue to improve, extending the capabilities of the appliances. Thus, it will be appreciated that information appliances such as PDAs can execute many useful software application programs to control or otherwise interact with other information devices.

As but one example of how a PDA might be useful as a "window" into the electronic world, a PDA can potentially replace a television-specific remote control and other appliance-specific remote controls with a single, universal control, i.e., the PDA. As understood by the present invention, however, a central impediment to providing such a universal information appliance is the inability to establish and change graphic user interfaces (GUI) on the fly. Using the above example to illustrate, the GUI required to execute the application of controlling a television set is very different from the GUI required to execute the application of controlling a garage door opener, which in turn requires a different GUI than transmitting data to a network, and so on. Thus, a universal information appliance must be capable of presenting application-specific GUIs if it is to function effectively as an all-purpose "window" to the electronic world.

Moreover, for a universal information appliance to optimize its user-friendliness, the present invention recognizes the desirability that a GUI be tailored to a particular user who might have a physical impediment or other special need. Unfortunately, present GUIs are static. Consequently, they cannot be dynamically changed or tailored for particular users. Accordingly, the present invention recognizes the desirability of easily and quickly tailoring the GUI of an application.

SUMMARY OF THE INVENTION

The invention is a general purpose computer such as an information appliance programmed according to the inventive steps herein to dynamically render a graphics user interface (GUI) on a universal information application (UIA) and to communicate with a globally shared, associatively addressed memory space such as the above-referenced "TSpaces". The invention can also be embodied as an article of manufacture—a machine component—that is used by a digital processing apparatus and which tangibly embodies a program of instructions that are executable by the digital processing apparatus to undertake the present logic. This invention is realized in a critical machine component that causes a digital processing apparatus to perform the inventive method steps herein. In other aspects, a computer program product is disclosed which is readable by a digital processing apparatus and which tangibly embodies a computer program. The computer program product combines a computer readable medium with program code elements that undertake the logic disclosed below. And, a computer-implemented method is disclosed for executing the logic herein.

Accordingly, in one aspect an information appliance including a display and at least one input device includes an application source, and a parser communicating with the application source. The input device can be manipulated to cause an application from the source to be sent to the parser. Then, the parser transforms the application into at least a list of graphical user interface (GUI) elements that are associated with the application and a list of elements that are also associated with the application, such that the list of GUI elements is made dynamically. A universal information appliance (UIA) engine accesses the lists to execute the application.

In a preferred embodiment, the UIA engine includes a UIA processor for executing the application and a UIA communication manager communicating data between the UIA processor and TSpaces. Preferably, a local data cache is provided on the UIA, and the UIA communication manager communicates with the local data cache when the information appliance is not communicating with TSpaces. On the other hand, when the UIA is connected to the TSpaces network, the communication manager communicates with a proxy for converting data from the UIA processor to tuples for use of the tuples by TSpaces. The proxy also converts tuples from the TSpaces to data that is usable by the UIA processor.

In the preferred embodiment, the application is written in the novel MoDAL language disclosed herein, and the parser converts the MoDAL application to binary language. The MoDAL language includes plural language elements for establishing: GUI elements, and action elements, at least some of which action elements can be associated with respective GUI elements. Also, MoDAL elements can be associated with respective action elements and respective GUI elements. The GUI elements are selected from the group of elements including one or more of forms, buttons, fields, lists, pop up triggers, menus, help strings, and tables, whereas the action elements are selected from the group of elements including one or more of database read, database write, database delete, tuple send, tuple query, formgoto, appstop, set, get, condition, and date.

In another aspect, a computer-implemented method is disclosed for executing an application. The method includes receiving the application and processing the application to identify graphical user interface (GUI) establishing instructions therein. Then, a graphical user interface (GUI) is dynamically rendered based on the GUI establishing instructions.

In still another aspect, a computer program product includes a computer program storage device that is readable by an information appliance, and a program means on the program storage device. The program means includes program code elements that embody instructions which are executable by the information appliance for performing method steps for dynamically rendering a graphical user interface (GUI) on a display associated with the information appliance. The method steps undertaken by the appliance include converting at least one application written in a plain text language to a binary format for executing the application. Also, the method steps include rendering the GUI on the display based on the binary format.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the overall logic of the present invention;

FIG. 4 is a block diagram of a particularly preferred architecture;

FIG. 5 is a flow chart of a particularly preferred logic;

FIG. 7 is a block diagram of a preferred UIA/TSpace interface.

DETAILED DESCRIPTION OF THE PREFERRED EMBODIMENTS

Figure 1:
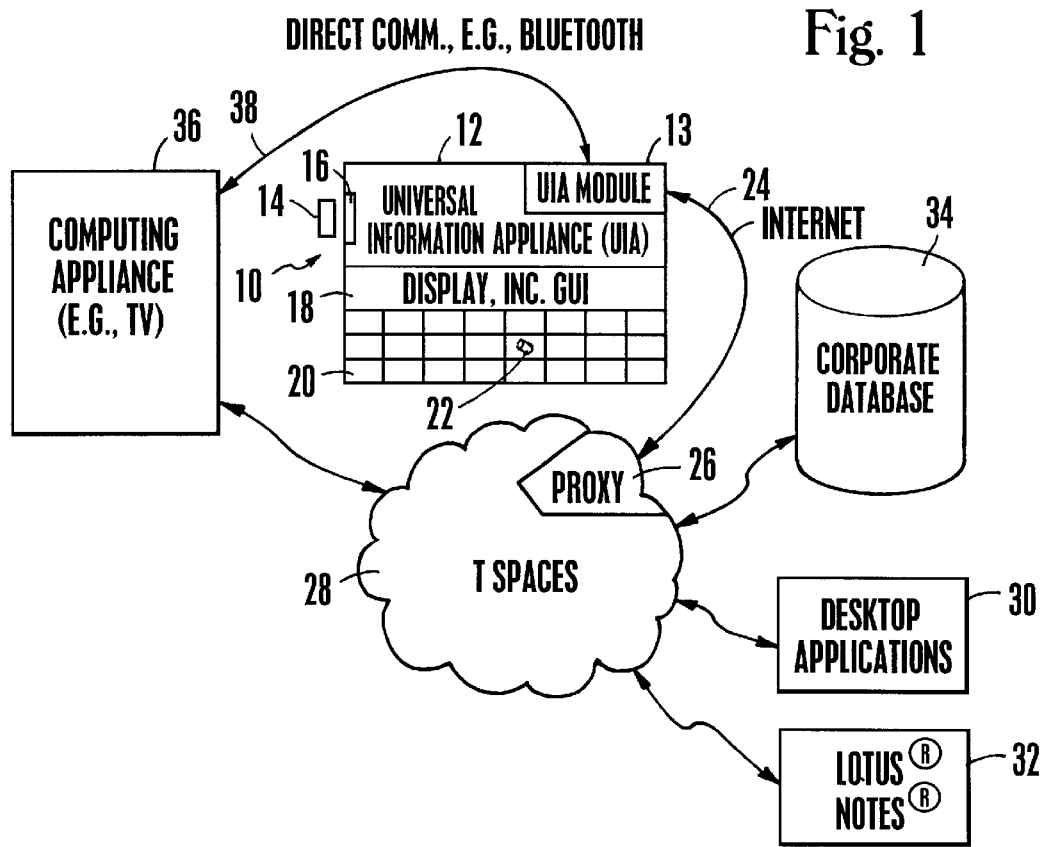
FIG. 1 is a schematic diagram of the present system.

Referring initially to FIG. 1, a system is shown, generally designated 10, that includes a universal information appliance (UIA) 12. In the particular architecture shown, the UIA 12 is a digital processing apparatus, such as a personal digital assistant (PDA) marketed under the trademark Workpad®, made by International Business Machines Corporation (IBM) of Armonk, N.Y., and running a Palm OS2 operating system, Berkeley-Sockets version. Other PDA models can be used, however, such as a Palm Pilot™ made by 3COM of California.

As disclosed in further detail below, the UIA 12 is programmed with a new computing language, referred to herein as "Mobile Document Application Language", or "MoDAL" for short. The below-disclosed MoDAL language permits the rapid development, rendering, and modification of graphics user interfaces (GUI), such that plural GUI instantiations of a widely used software application can be respectively tailored to suit the needs of particular users, e.g., physically challenged users.

Specifically, the use of MoDAL facilitates the following three advantages. First, MoDAL facilitates rapid application development, such that a MoDAL application can be written in a matter of hours, compared to weeks or months that it would take to write the same application in a programming language such as "C". Second, MoDAL is independent of the type of PDA on which it is used. Furthermore, MoDAL applications can be dynamically loaded and executed, such that new applications or new device interfaces can be downloaded and used immediately, thus facilitating the above-mentioned advantage in improved GUIs. Because MoDAL permits changing the GUI of an application "on the fly", the GUI can be personalized to each end user based on a variety of considerations, including the particular data being processed, the user's experiences, the user's current physical context (including location), and the user's special capabilities. Typically, the "tailoring" is done by the server from which the particular application is downloaded, although some tailoring can be undertaken by the user.

It is to be understood that while the preferred UIA 12 is embodied in a personal digital assistant (PDA), it may also be embodied in other digital processing apparatus. For example, the UIA 12 can be embodied in a personal computer, or in any other computer, including computers sold under trademarks such as AS400, with accompanying IBM Network Stations. Or, the UIA 12 can be embodied by a Unix computer, or OS/2 server, or Windows NT server, or IBM RS/6000 250 workstation, or an IBM laptop computer.

The UIA 12 includes a computer program product, and specifically a UIA module 13, schematically shown in FIG. 1, which may be executed by a processor within the UIA 12 as a series of computer-executable instructions. These instructions may reside, for example, in RAM of the UIA 12.

Alternatively, the instructions may be contained on a data storage device with a computer readable medium, for example a computer diskette or PCMCIA card 14 that is engageable with a drive 16 of the UIA 12. Or, the instructions may be stored on a DASD array, magnetic tape, conventional hard disk drive, electronic read-only memory, optical storage device, or other appropriate data storage device, such as but not limited a Web server from which the instructions can be downloaded from, e.g., the above-mentioned "TSpaces". In an illustrative embodiment of the invention, the computer-executable instructions may be lines of extensible markup language (XML) code configured in the below-disclosed "MoDAL" language.

FIG. 1 also shows that the UIA 12 can include peripheral computer equipment known in the art, including an output device such as a monitor 18 (e.g., a flat panel display). Other types of sensory displays can be used, including tactile sensor "displays" and audio "displays". Thus, as used herein "display" means any component that produces signals that can be sensed by a human as part of a user interface, such as a visual graphics user interface (GUI).

Additionally, the UIA 12 can include an input device such as a computer keyboard or keypad 20 and/or a pointing device, such as a joystick or trackball 22. Other output devices can be used, such as other computers, and so on. Likewise, input devices other than the keyboard 20 and mouse 22 can be used, e.g., touch screens and voice recognition devices.

In the preferred embodiment, the UIA 12 accesses, via a data transmission path 24 such as the Internet, a proxy 26 that is associated with one or more globally shared, associatively addressed memory spaces such as the above-referenced "TSpaces" 28, for exchanging data between the UIA 12 and the TSpaces 28. The proxy 26 converts data from the UIA 12 to tuples (i.e., self-describing vectors or arrays of values) for use of the tuples by the TSpaces 28, and the proxy 26 also converts tuples from the TSpaces 28 to data that is usable by the UIA 12. These tuples can originate from, e.g., other network devices such as other desktop applications 30, Lotus® Notes® 32, or a corporate database 34 that communicate with the TSpaces 28.

Additionally, the UIA 12 can communicate with other computer appliances via communication paths other than the Internet 24. For example, the UIA 12 can communicate with a television 36 via a direct communication path 38 using infrared communication principles or using radio-frequency communication principles such as "Bluetooth" radiofrequency communication, a 2.4 GHz system defined by an industry consortium. It is to be understood that wired communication systems as well as wireless can be used.

Figure 2:
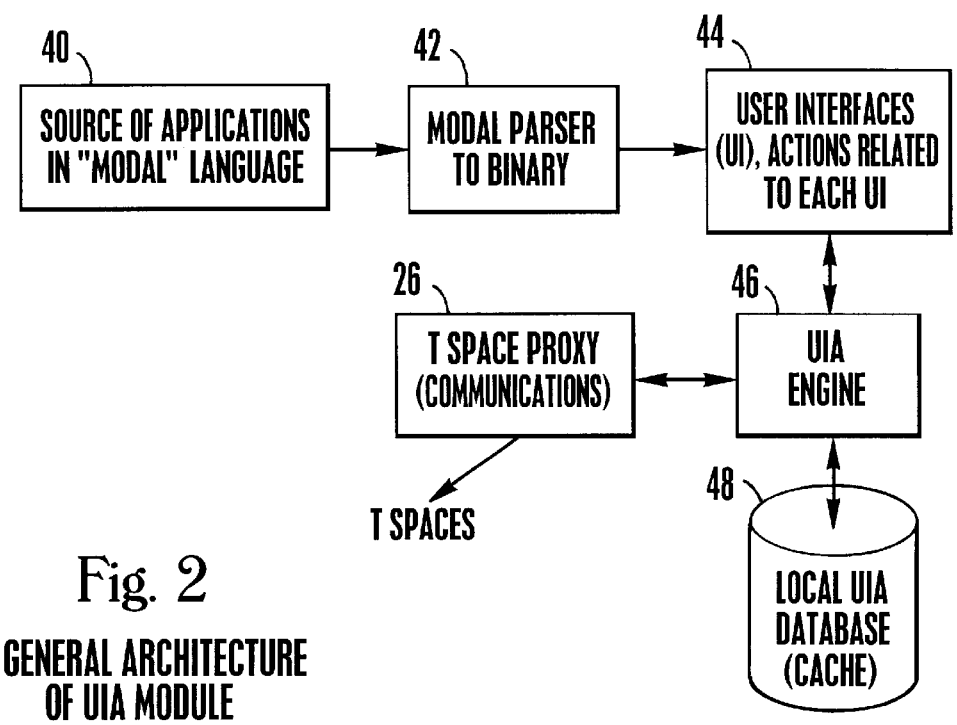
FIG. 2 is a block diagram of the general architecture of the present invention.

The general logical architecture of the UIA module 13 can be seen in reference to FIG. 2. As shown, a source 40 of UIA applications that are written in the below-disclosed XML-based MoDAL language communicates with a parser 42. The parser 42 converts the applications received from the source 40 to binary code, and parses out of the applications various application related-data tables or streams 44. In the preferred embodiment, the parser 42 generates both a list of user interface elements that are called for by the application, and a list of actions related to each user interface element.

As described in detail below, a UIA engine 46 communicates with the application related-data tables or streams 44 for executing the applications from the source 40. Also, the UIA engine 46 communicates with a local data cache 48 that is onboard the UIA 12, i.e., that is enclosed in the same PDA housing as the engine 46. Furthermore, the UIA engine 46 communicates with the proxy 26 for exchanging data with the TSpaces 28 shown in FIG. 1 when the UIA 12 is connected to the Internet 24. It is to be understood that the UIA engine 46 sends data to the data cache 48 when the UIA engine 46 is not connected to a network.

The overall logic of the present invention can be seen in reference to FIG. 3. Commencing at block 50, an application written in the below-disclosed MoDAL language is received. Moving to block 52, the application is converted to binary and parsed by the parser 42 to dynamically generate the lists mentioned above, including a list of GUI elements associated with the application. Proceeding to block 56, the UIA engine 46 uses the output of the parser 42 to execute the application at run time, presenting the appropriate GUI elements on, e.g., the display 18 as it does so. Then, at block 56 the data output when the UIA engine 46 executes the application is stored in the local data cache 48, if the UIA 12 is not connected to a network, and otherwise is transmitted to the network for, e.g., conversion of the data to tuples by the proxy 26 (FIG. 1) for "posting" of the tuples in the TSpaces 28. Thus, the use of MoDAL allows a GUI to be defined on the fly by the application developer, each time the application is downloaded to a user.

The preferred MoDAL language is a specific definition of XML, with statements to create UI elements, and to access the data cache 48 and TSpaces 28. Each MoDAL application can have some or all of the following elements:

Application

UI elements

Actions associated to the UI elements

Flow control elements

Variables

MoDAL types

Comments

The description of each of the above items is completed in a MoDAL statement of the form:

<Element_name attributes>, it being understood that elements can be nested within each other as described below. The UI elements include Form, Button, Field, List PopUpTrigger, Menu, Help strings, and Tables, whereas the Action elements include Data base Read, Data base Write, Data Base Delete, Tuple Send, Tuple Query, FORMGOTO, APPSTOP, SET, GET, CONDITION, DATE, and TIME. Also, MoDAL data types include int (for "integer"), float (for a floating point decimal), char (meaning a character), and string. Other MoDAL elements include ELEMENT, which is used to store specific values that can be from UI elements or that can be retrieved either from the local cache 48 or TSpace 28.

The below syntax sets forth an example (referred to herein as "example 1") of a high level form of a plain text MoDAL application that will be referred to from time to time in the following discussion of the MoDAL language:

```
<APPLICATION name = Hello>
    <FORM name="MainForm" label="Hello"
    x="160" y="160" height="160" width="160">
        <TEXTFIELD name="TFhello" x="80"
        y="130" height="12" width="80"
        maxchars="30" multiline="true">
        </TEXTFIELD>
        <BUTTON name="BHello" label="Say hi" x="120" y="145">
            <ACTION>
                <SET name="TFhello">
                    <STRING>"Hello World"</STRING>
                </SET>
            </ACTION>
        </BUTTON>
    </FORM>
</APPLICATION>
```

With the above example in mind, MoDAL syntax is set forth as follows.

The name of the application, and its "owner", are set forth in the first line above. In general, the format for setting forth the application name and owner is <APPLICATION name= "string" owner="string2">; </APPLICATION>.

A "form" is the top of the MoDAL descriptions. All other statements are inside this one. The name field in the first exemplary line above is a required attribute, and it is used only for identification purposes. The owner field is optional and it will default to "MoDAL". In the fields above, the types of data in the name and owner fields are indicated as being character strings.

Moving to the next line in Example (1), an example "form" element is as follows:

<FORM name="string" label="string2" x="string3" y="string4" height="string5" width="string6" [savebehind= "true"|"false"] [menu="string7"] [MoDAL="true"|"false"] [usable="true"|"false"] [help="help_name"]>

It is to be understood that other elements, such as GUI elements, e.g., fields, buttons, etc., should be defined inside a Form. The syntax </FORM> defines a form, which is needed to declare any other UI element.

Required attributes fields in forms are as follows (using entries in the example above):
name: id used to invoke the form, used in <FORMGOTO name="formname"></FORMGOTO>label: title of the form;
x: x coordinate of the top left corner of the form, x="0";
y: y coordinate of the top left coordinate of the form, y="0";
height: height in pixels, height="160"; and
width: width in pixels, width="160".

In contrast, optional attributes that can be part of a form are as follows:
savebehind: turn on, off the savebehind bit, default is false;
menu: id of the menu element to be associated with this form, default is no menu, menu="MainMenu";
MoDAL: turn on, off the MoDAL bit, default is false;
usable: turn on, off the usable bit, default is true;

help: id of the help element associated with this form, help="HelpString";

As shown in example (1) above, a TextField can also be provided having the following syntax:
<TEXTFIELD name="string1" x="Xvalue" y="Yvalue" height="Hvalue" width="Wvalue" maxchars="value" [SingleLine="true"|"false"] [usable="true"|"false"]; [editable="true"|"false"] [underline="true"|"false"] [autoshift="true"|"false"]
[ScrollBar="true"|"false"] [numeric="true"|"false"]>
   [<ACTION>
   </ACTION>]
</TEXTFIELD>

Actions may be defined to occur when a user selects the text field. Required attributes of a textfield are as follows:
name: id of the text field;
x,y,height,width: coordinates and dimensions of the field in pixels; and
maxchars: maximum number of chars the field can contain.
Optional attributes of the "text field" include:
singleline: field can only have 1 line of text, no carriage return is accepted, default is false;
usable: field is displayed on the form if set to true, default is true;
editable: if true user can enter values, if false values are set only from the application, default is true;
underline: true or false, displays underlined characters, default is false;
autoshift: set autoshift, true or false, default is false;
scrollbar: field has a vertical scrollbar, true or false, default is false; and
numeric: field can contain only numeric characters, true or false , default is false.

Further, example (1) above shows that a GUI button element can be defined in a form, and the syntax to do so is as follows:
<BUTTON name="buttonid" label="text" x="xvalues" y="yvalue";
   [usable="true"|"false"]>
   [<ACTION>
   </ACTION>]
</BUTTON>

It is to be understood that the "Actions" listed in the action fields are associated with the button and are triggered when the user clicks the button. Required attributes of the "button" are as follows:
name: id of the button;
x,y,height,width: coordinates and dimensions of the button in pixels; and
label: text to be shown on the button.
Optional button attributes include "usable", which indicates whether the button is displayed on the form (if set to true), with the default being true.

In addition to or in lieu of a button, a GUI checkbox can be defined in a form, and the syntax to do so is as follows:
<CHECKBOX name="CB_name" label="text" x="int" y="int" selected="false"
[usable="true"|"false"]>
[<action>
   </action>]
</CHECKBOX>

This syntax defines a checkbox in a form and lists actions that will be invoked when the user click on the checkbox. Width and height attributes are not used, it being understood that they are set automatically depending on the number of characters in label.

Required attributes of the checkbox definition are:
name: id of the checkbox;
x,y: coordinates of the checkbox in pixels;
label: text to be shown on the checkbox; and
SELECTED: true or false, with "true" displaying the checkbox as selected.
Optional attributes of a checkbox include "usable", which indicates whether the checkbox is displayed on the form (if set to true), with the default being true.

A "CheckBoxGroup" can also be defined on a form with the following syntax:
<CHECKBOXGROUP name="group_name">
[<checkbox>..]
</CHECKBOXGROUP>

This feature of the MoDAL language is used to group one or more check boxes together, and only one checkbox will be checked at a time inside the group.

A Label element can also be defined in a form using this syntax to add static text to a Form:
<LABEL name="label_name" label="text in the label" x="int" y="int"></LABEL>

The height and width of a label are calculated based on the number of characters in the label.

Furthermore, using MoDAL syntax a List can be defined in a form thusly:
<LIST name="list_name" x="int" y="int" height="int" width="int" rows="int" [visibleRows="int"]
[usable="true"|"false"]>
   [<ACTION>MoDAL_actions </ACTION>]
</LIST>

Actions set forth in the definition of a "list" are executed when the user selects a row in the list. The attribute selected indicates the row number of the user selection, with rows being numbered starting from the top and being zero-based. Optional attributes of a list are:
visibleRows: number of rows in the list to display, defaults to the value of rows; and
usable: true or false, defaults to true, it should be false when declared inside a POPUP menu or list as described more fully below.

With the above in mind, a POPUP menu or list element is defined in a form as follows:
<POPUP name="popup name" label="popup_label" x="value" y="value" [usable="true"|"false"]>
   [<LIST . . . >MoDAL_actions</LIST>]
</POPUP>

A POPUP element may contain only one LIST declaration. The height and width of a POPUP list are calculated based on the number of characters in the label attribute. Lists that are declared inside a POPUP element should have the usable attribute set to "false". MoDAL actions inside this List may not be required because the preferred Palm operating system (OS) automatically sets the POPUP label to the list selection.

A menu UI element can be defined thusly:
<MENU name="menuName">
   <SUBMENU label="MenuLabel">
   [<SEPARATOR></SEPARATOR>]
   <ITEM label="ItemLabel">
     [<ACTION>MoDAL_actions</ACTION>]
   </ITEM>
[<SEPARATOR></SEPARATOR>]
[<ITEM>. . . [<SEPARATOR></SEPARATOR>]. . . ]
[<KEYBOARD></KEYBOARD>]
[<GRAFFITI></GRAFFITI>]
   </SUBMENU>
[<SUBMENU>. . . ]

</MENU>

The above syntax defines a menu element inside an application. This syntax must be defined outside a form, before the form it will use it. Menus are associated with a form by setting the menu attribute of the form to the name of the menu.

In accordance with the present invention and as indicated in the syntax above, menus contain one or more sub menus, and sub menus contain one or more "items". Items may contain actions that are associated with the menu for invoking the actions when a user clicks on the menu. Moreover, a "separator" draws a horizontal line between menu items. Separators may be declared anywhere in a sub menu, outside "items" declarations. The "keyboard" syntax, on the other hand, brings up the keyboard reference dialog, the focus of which should be on a TEXTFIELD. Otherwise, the Palm OS will not display the keyboard. Completing the explanation of the menu syntax, "graffiti" invokes the graffiti reference dialog, if any.

Returning to what can be defined inside a form, a "help" string in a form can be defined as follows:
<HELP name="helpName" label="help text"></HELP>

The help string is associated with the form element by setting the help attribute to the "help" name attribute, i.e.,: help=help_string.

Additionally, a table can be defined inside a form thusly:
<TABLE name="table_name" x="int" y="int" height="int" width="int" rows="int"
   cols=int [visibleRows="int"] [usable="true"|"false"]>
   [<ACTION>MoDAL_actions </ACTION>]
</TABLE>

In the above syntax, the row height and column width is the dimension of the table divided by the number of columns or rows.

As disclosed previously, in addition to UI elements, action elements can be defined as shown in example (1), and the preferred syntax for the first action element (reading data from the local cache 48) is as follows:
DBREAD (database read):
<DBREAD name="dbName">
  <RECORD>
    <GET . . . >|MoDALTYPE
  </RECORD>
  <FIELD>
    <SET name="element_name" attr="atr_name"></SET>
  </FIELD>
  [<!—other fields—>]
</DBREAD>

The DBREAD action reads a record from the local data cache 48. The value inside the <RECORD> element indicates what numerical record to read. It must be an integer, or the attribute of an <ELEMENT> that stores and integer. The <FIELD> elements specify where to store the retrieved information. One or more fields may be retrieved on one DBREAD operation. As set forth more fully below, various types of MoDAL values such as integers, floating point decimals, strings, and characters for the various variables that are called for can also be defined.

As an example, assume that a MoDAL application includes a form and a list that will be updated after retrieving data from the local data cache 48, with a button being used to read the data cache 28 and update the list with the retrieved information. The syntax to invoke this is:

```
<APPLICATION name="DB read example">
    <FORM name="exForm" x="1" y="1" height="160" width="160">
        <LIST name="exList" x="10" y="25" height="80"
        width="80" rows="5"></LIST>
        <BUTTON name="update" x="60" y="20" label="update">
            <ACTION>
                <DBREAD name="data_base_name">
                    <RECORD><INT>"1"</INT></RECORD>
                    <FIELD> <SET name="exList"
                    row="1"></SET> </FIELD>
                </DBREAD>
            </ACTION>
        </BUTTON>
    </FORM>
</APPLICATION>
```

The DBWRITE (database write) action element writes data to the local cache 48 using the following syntax:
<DBWRITE name="dbName">
  <RECORD>
    <GET . . . >|MoDALTYPE
  </RECORD>
  <FIELD>
    <GET name="element_name"></GET>
  </FIELD>
  [<!—other fields—>]
</DBWRITE>

The value inside the <RECORD> element indicates what numerical record to write. It must be an integer, or the attribute of an <ELEMENT> that stores an integer. The <FIELD> elements specify where to get the information to be written. One or more Fields may be retrieved on one DBWRITE. When reading the information with a DBREAD the type of the fields should match the ones used during a DBWRITE.

As an example, assume that a MoDAL application intends to write a text field to the local cache 48 using a button. The following syntax would be used:

```
<APPLICATION name="DB write example">
    <FORM name="exForm" x="1" y="1" height="160" width="160">
        <TEXTFIELD name="exfield" x="10" y="25" height="20"
        maxchars="80" ></TEXTFIELD>
        <BUTTON name=exButton x="60" y="20" label="save">
            <ACTION>
                <DBWRITE name="data_base_name">
                    <RECORD><INT>1</INT></RECORD>
                    <FIELD> <GET name="exfield"></GET> </FIELD>
                </DBWRITE>
            </ACTION>
        </BUTTON>
    </FORM>
</APPLICATION>
```

It is to be understood that the user can write data in the text field in, e.g., record 1 of the data base "data_base_name".

In addition, DBDELETE can be used to delete data in the cache 48 using the following syntax:
<DBDELETE name=dbName>
  <RECORD>
    <GET name=element_name attr="attr_name">
  </RECORD>
</DBDELETE>

The value inside the <RECORD> element indicates what numerical record to delete. It must be an integer, or the attribute of an <ELEMENT> that stores an integer.

As discussed previously, the UIA 12 can transfer data not only to the local cache 48, but to a network data storage such as TSpaces 28. To this end, a TQUERY action can be defined using the following syntax to read a tuple from the specified space in the Tspaces 28:

```
<TQUERY name="space_Name">
   <FIELD>
      <SET name="element_name" attr="atr_name"></SET>
   </FIELD>
   [<!—other fields—>]
</TQUERY>
```

The <FIELD> elements specify where to store the retrieved information. The type of the field is obtained from the type of the attribute of the element where the value will be stored, and the type for all GUI elements is <STRING> except for <CHECKBOX>, in which case it is an <INT> (integer). "Set" and "get" actions are discussed further below.

Further, "fields" may have a defined type and value, for example:

```
<FIELD>
   <STRING>"NEW"</STRING>
</FIELD>
```

The previous lines specify a Field that contains a string and the value should be "NEW". One or more Fields may be retrieved on one TQUERY.

As an example, assume that it is wished to update a list after retrieving data from TSpaces using a button to read the data from the TSpaces and update the list with the retrieved information. The following syntax would be used:

```
<APPLICATION name="Tuple Query example">
   <FORM name="exForm" x="1" y="1" height="160" width="160">
      <LIST name="exList" x="10" y="25" height="80"
         width="80" rows=5></LIST>
         <BUTTON name="update" x="60" y="20" label="update">
            <ACTION>
               <TQUERY name="Tspace_name">
                  <FIELD> <SET name="exlist" row="1"> </FIELD>
               </TQUERY>
               <!-- this TQUERY should result in a query for a
               Tuple from TSpaces that contains a string -->
            </ACTION>
         </BUTTON>
   </FORM>
</APPLICATION>
```

A "TSEND" action can be used to send data to the TSpaces proxy 26 and thence to TSpaces 28 using the following syntax:

```
<TSEND name="space_Name">
   <FIELD>
      <GET name="element_name" attr="atr_name"></GET>
   </FIELD>
   [<!—other fields—>]
</TSEND>
```

The <FIELD> elements specify where to get the information to be sent. Elements contained in a FIELD definition in a TSEND include:

GET, DATE, TIME, STRING, INT, FLOAT, CHAR

One or more TSend fields may be used.

As an example, assume a text field in a form is to be sent to TSpaces using a button to write the information to TSpaces. The following syntax is used:

```
<APPLICATION name="TSend example">
   <FORM name="exform" x="1" y="1" height="160" width="160">
      <TEXTFIELD name="exfield" x="10" y="25" height="20"
         maxchars="80" ></TEXTFIELD>
      <!- the user can write data in the text field, this will be
      written in record 1 of the TSpace
      "TSpace_name" ->
      <BUTTON name=exButton x="60" y="20" label="save">
         <ACTION>
            <TSEND name="TSpace_name">
               <FIELD> <GET name="exfield"></GET> </FIELD>
            </TSEND>
         </ACTION>
      </BUTTON>
   </FORM>
</APPLICATION>
```

As alluded to above, a "FORMGOTO" action is provided for invoking a name. The syntax associated with this action is:

```
<FORMGOTO>
   <GET name="element_name" attr="atr_name"></GET>
</FORMGOTO>
```

Here, the element name is the name of the Form to display and is associated with an <ACTION> element. A <STRING> element may be defined as the form name.

In some of the above examples, "set" and "get" actions are used. The "set" action sets the attribute of an element to the type value specified as follows:

```
<SET name="element_name" [row="int" [col="int"]]>
   [[MoDAL type]|[<GET . . . >]]
</SET>
```

The value is optional, and is not used when a "set" action is within a DBREAD or TQUERY action, because the value used under those circumstances will be the one retrieved from the local data base or from TSpaces. "Row" is used if accessing a list or table element, and "Col" is used only if accessing a table. Also, a special value ("selected") can be specified to get the user selection on either "Row" or "Col". "MoDAL type" defines the type of data as described further below.

The "set" action has a scope wherein it can be used to set values in <ELEMENT ..> fields outside the form where the "set" action is contained, and it can also set values in UI elements in the same form where the "set" action is contained. The elements that can have values set include:

TEXTFIELD (set to a STRING);
LIST specify ROW (set to a STRING);
TABLE specify ROW and COL (set to a STRING);
CHECKBOX (set to an int, char or float). A 0 value will be not checked, and anything else is checked; and
ELEMENT (set to the type used to define the ELEMENT).

A "get" action is provided to retrieve the attribute value of an element as follows:

```
<GET name="element_name" [row="int"|"SELECTED"
[col="int"|"SELECTED"]]></GET>
```

The "get" action is used within DBWRITE, TSEND, or ACTION elements. "Row" is used when getting a value from a list or a table, and "Col" is only used when getting a value from a table. "SELECTED" can be specified to get the current selection, it being understood that "SELECTED" is used only if an ACTION is contained in a LIST or TABLE. Using "SELECTED" from outside a LIST or TABLE will invalidate the GET action, resulting in a NULL value.

The "get" action can obtain values from <ELEMENT ...> fields outside the FORM where the GET action is contained, and it can also obtain values from UI elements in the same form where the GET action is contained. A GET action obtains values from the following elements:
TEXTFIELD (gets a STRING);
LIST specify ROW, (gets a STRING);
TABLE specify ROW and COL, (gets a STRING);
CHECKBOX gets an int. A 0 value will be not checked, and anything else is checked; and
<ELEMENT (get the type defined with the ELEMENT).

A "date" action of the syntax <DATE></DATE> returns a STRING element with the current date in the UIA 12 clock. Similarly, a "time" action having the syntax <TIME></TIME> returns a STRING element with the current time in the UIA 12 clock. In contrast, an "application stop", or APPSTOP action element having the syntax
<APPSTOP>
    <GET name="element_name" attr="atr_name"></GET>
</APPSTOP>
stops the processing of events for a MoDAL application. The APPSTOP action element draws a form listing other available MoDAL applications to allow the user to run a different MoDAL application. Thus, this keyword will signal the MoDAL engine to stop, and exit the current form.

Having described UI elements and action elements, "MoDAL Type" elements are now disclosed. As listed above, one type of MoDAL element is an integer having, for example, a syntax as follows: <INT>123</INT> to define the integer constant 123. Another MoDAL type element is the floating point decimal, defined as follows: <FLOAT>123.456</FLOAT> (which, in the example, defines the float constant 123.456). Still another MoDAL element is "character", which defines a letter, e.g., <CHAR>"A"</CHAR> defines the character constant "A". Furthermore, a string of characters can be defined using the syntax <STRING>"HELLO"</STRING>. In this example, the character string "HELLO" has been defined.

Other elements can also be defined. For example, the element "ELEMENT" can be defined as follows:
<ELEMENT name="element name" type="int"|"float"|"char"|"string"></ELEMENT>

In the preceding example, the "ELEMENT" syntax has been used to define a named element that can store the type of values defined in "type" entry. A value can be set using a "SET" action and retrieved with a "GET" action.

Additional MoDAL grammar is set forth in the appendix at the end of the specification.

Now referring to FIG. 4, a preferred architecture for use when the UIA 12 is embodied by an IBM Workpad® is shown. As shown, the source 40 of MoDAL applications (FIG. 2) can be established by an event loop 58 that is controlled by the operating system 60 of the UIA 12. The event loop 58 communicates events to the UIA engine 46, and more particularly to a UIA manager 62 and a UIA application processor 64. The UIA manager 62 manages the operation of a UIA communication manager 66, which communicates with the UIA application processor 64 to communicate data between the application processor 64 and either the TSpace proxy 26 (if the UIA 12 is connected to the network) or the local data cache 48 (when the UIA 12 is not connected to a network).

Additionally, the UIA manager 62 controls the flow of data to the parser 42. As discussed above, the parser 42 transforms the above-disclosed MoDAL syntax to binary to extract GUI establishing instructions therefrom as part of the dynamic GUI establishment feature of the present invention.

In response to the parsed GUI instructions of the MoDAL application received by the parser 42, the parser 42 accesses a library 68 of user interface classes. This library 68 contains the necessary GUI classes, i.e., definitions, of the MoDAL GUI elements that can be invoked by a MoDAL application.

After retrieving the appropriate GUI classes from the library 68, the parser generates the application related data tables or streams 44 based on the specific GUI instructions contained in the particular MoDAL application being processed. More particularly, the parser 42 generates a list 70 of GUI resources (i.e., GUI elements that are to be used for the particular MoDAL application being processed). Each GUI resource in the list 70 is associated with a unique ResourceID, with the ResourceIDs being assigned in sequence starting from a numeric setpoint MoDALMANAGERTOP++1, for reasons to be shortly disclosed. Also, the parser 42 generates an elements list 72, which sets forth the various actions that have been associated with the GUI resources in the list 70 as defined in the MoDAL application. Each element node in the elements list 72 points to its parent and child nodes, its attributes, and its value. Each MoDAL element can be defined using the following syntax:
<TAG attributes [more attributes]>
    <CHILDTAG attributes [more attributes]>
    </CHILDTAG>
</TAG>

As shown in FIG. 4, the UIA application processor 64 accesses the list 70 of GUI resources and elements list 72 during execution of the MoDAL application (i.e., during subsequent receipt of MoDAL application events for execution from the event loop 58) to dynamically present a GUI that can have been easily, quickly, and specifically tailored for the user of the UIA 12.

Figure 6:
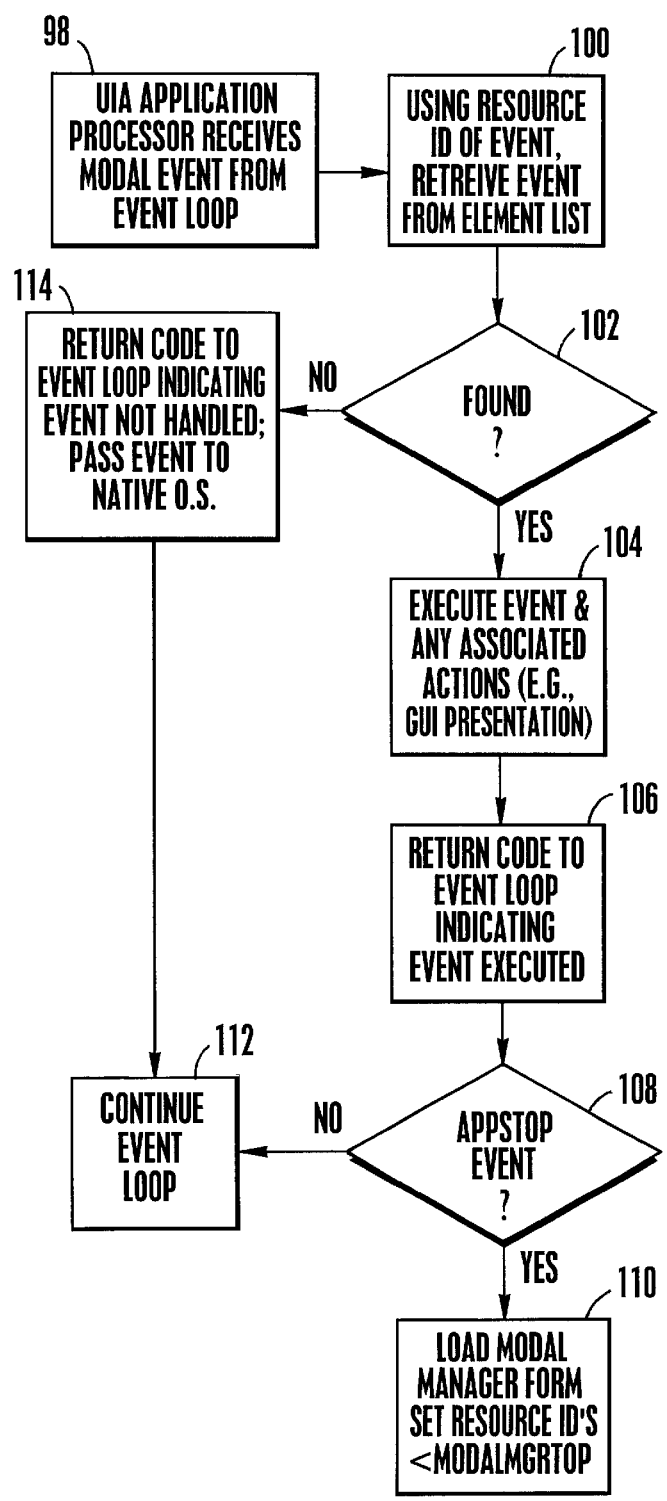
FIG. 6 is a flow chart that is a continuation of FIG. 5.

The operation of the system architecture shown in FIG. 4 can be appreciated in reference to FIGS. 5 and 6. Commencing at block 74 in FIG. 5, the MoDAL manager 62 is started. Moving to block 78, a form is displayed to the user that lists the available MoDAL applications on TSpaces, or on the local data cache 48. At block 78, the event loop 58 (FIG. 4) is started, and then at block 80 the form listing the available MoDAL applications is loaded.

From block 80, the process can move along two logical paths. Specifically, the process can move from block 80 to decision diamond 82, wherein it is determined whether the ResourceID of the current event in the event loop 58 is higher than a numeric setpoint referred to herein as "MoDALMANAGERTOP". No events, until they have been parsed by the parser 42 as more fully disclosed below, have a ResourceID greater than "MoDALMANAGERTOP". Accordingly, in the first iteration the test at decision diamond 82 is negative, and the process consequently moves to block 84 to continue the event loop 58 processing using the next event, sending the current event to the host operating system for processing. When, however, an event is found at decision diamond 84 to have a ResourceID greater than "MoDALMANAGERTOP", the logic moves to block 86 to pass the event to the UIA application processor 64 of the UIA engine 46 for execution of the event and/or display of the dynamically established GUI, as more fully set forth below in FIG. 6.

Additionally, the logic can move from block 80 in FIG. 5 to block 88, wherein a user selection of a MoDAL application on the form of applications (presented at block 78) is received. Proceeding to block 90, the MoDAL application is sent by the manager 62 to the parser 42. The logic of the parser, at block 92, parses the application as described and, using the library 68 of UI classes (FIG. 4), generates the list 70 of GUI resources and elements list 72.

From block 92, the logic moves to block 94, wherein the main form of the selected application is loaded by invoking the "FormGoTo" application programming interface (API) that has a ResourceID at least one greater than "MoDAL-MANAGERTOP". Proceeding to block 96, the main form is sent to the event loop 58, and the logic loops back to block 84 to continue processing as described.

FIG. 6 shows the logic of the UIA application processor 64, once a MoDAL application has been processed by the parser 42. Commencing at block 98, the UIA application processor 64 receives an event from the event loop 58, the test at decision diamond 82 in FIG. 5 having been positive following the step at block 94 in FIG. 5. At block 100, using the ResourceID of the received event, the application processor 64 retrieves the event from the event list 72 (FIG. 4), if the event is present in the list 72. At block 102, it is verified that the event has indeed been found in the list 72, and if so, the event (associated actions, GUI presentations, etc.) is executed by the application processor 64.

After executing the event at block 104, the application processor 64 returns a code to the event loop 58 at block 106, indicating that the event has been executed. Next, at decision diamond 108 it is determined whether the event was an application termination (i.e., an "appstop" event), and if it was, the logic moves to block 110 to load the MoDAL manager form (that lists the available MoDAL applications) and to set all ResourceIDs to less than the value of "MoDALMANAGERTOP". In contrast, if the event was not an application termination at decision diamond 108, the logic moves to block 112 to continue the event loop to continue executing the MoDAL application.

Recall that at decision diamond 102 it is verified that the event has been found in the list 72. When an event is not found, the logic moves to block 114 to return a code to the event loop 58 indicating that event has not been handled by the application processor 64, and that the event consequently should be passed to the native (host) operating system for execution. The event loop is then continued at block 112.

With the above architecture, logic, and MoDAL language description in mind, it can now be appreciated that the present invention generates UI components or elements, performs general computation, and interacts with both the local data cache 48 and TSpaces 28 such that real dynamic user interface rendering is undertaken and database and data caching functions are also undertaken. By "dynamic" user interface rendering is meant that the MoDAL language permits the user interface to be defined and modified on the fly both locally and remotely. Such adaptive user interfaces will be come more important as PDAs become more pervasive.

In some cases, through simple learned behavior the UIA 12 can change the interface on the fly to better suit the user, and can also save the changed interface (and associative function) in the original application description, which can then be saved on a network server for permanent storage. Because the user interface can be generated on the fly, the interface can be composed in such a way that it is completely personalized to the end user based on a variety of parameters. The local database function advantageously gives all applications a uniform data representation, one that allows data to cross over from one application to the next.

With this invention, the UIA 12 can be used as a universal remote control for any device, such as a television, and as a universal portal into any software program. Further, the UIA 12 can establish an adaptive interface infrastructure for special handicapped devices. Also, the UIA 12 can establish medical application interfaces for interacting with a complex database of information.

FIG. 7 shows a preferred interface with TSpaces 28. First, the preferred TSpaces proxy 26 has the following structure:

Buffer Length: Total length of the data being sent;

Link ID: constant value used to identify the type of flow between the proxy 26 and UIA 12;

TSSS TspaceSend( ) data sent from UIA 12 to the proxy 26;

TSSR TspaceReceive( ) data sent from UIA 12 to the proxy 26;

TSSQ TspaceQuery( ) data sent from UIA 12 to the proxy 26;

TSRS TspaceSend( ) data sent from the proxy 26 to UIA 12;

SRR TspaceReceive( ) data sent from the proxy 26 to UIA 12; and

TSRQ TspaceQuery( ) data sent from the proxy 26 to UIA 12.

The proxy 26 includes a data buffer that contains an array of fields up to the total length of the buffer, with each field having the following structure:

Field Length: length of the field, including length, type and value;

Type: type of value stored in the field; and

Value: value stored in the field. This part of a field does not exist in the case wherein a TspaceQuery( ) is sending only a data type with no specific value.

With above preferred proxy 26 in mind, FIG. 7 shows that the UIA 12 communicates with the proxy 26 as described previously, with the proxy 26 in turn communicating with TSpaces 28. A MoDAL application can be used to send tuples to TSpaces 28, with the tuples having a defined tuple structure. An interface application (registered at the Tspaces server) will be listening, expecting to receive these specific tuples. The listening application will attempt to identify the received Tuples as data intended to be sent to a Lotus® Notes® database 112 (or as a query request for Lotus Notes). The predefined tuple structure makes it easy for the MoDAL programmer to specify the tuple as an instruction or data that the interface will receive and will perform some action to obtain to send/update data from the database 112, while passing a minimum number of Notes parameters.

A listener waits for information to be written to a TupleSpace (TransTupleSpace). An API call to, e.g., the database 112 will depend on the request (key). The return code that is returned from Notes is handled by a return code class 113, which places this return code on the TransTupleSpace (key=TTSreturn). The main Java-language module of a translistener class 114 registers a callback class 115 with the TSpaces 28 server. When a certain tuple is written to the TransTupleSpace, the translistener call back class 115 is called with the tuple information. This information is routed by calling a notes thread class 116. This class 116 should process the information or call another class to do so.

Appendix - Further MoDAL grammar

::= MComent_Statement* MStart_Statement MBody MEnd_Statement EOF

---

```
MComent_Statement ::= S* '<' '!' '--' ( (Char - '-') | ('-' - (Char - '-')))*
                      '--' '>'
MStart_Statement  ::= S* '<' 'APPLICATION' S+ NAME_ATTRIB  (S* OWNER_ATTRIB)?
                      S* '>'
MBody             ::= MForm ( MForm* | MMenu* | MHelp* | MIgnor* )*
                      [VC: It should be a form.name = 'main']
MEnd_Statement    ::= S* '<' '\' 'APPLICATION' S* '>'
```

---

```
MForm  ::= MFormStart MFormBody MFormEnd
MMenu  ::= MMenuStart MMenuBody MMenuEnd
MHelp  ::= S* '<' 'HELP' S+ NAME_ATTRIB S* LABEL_ATTRIB S* '>''</HELP>
MIgnor ::= '<' TAG S+ ( (Char-[^'>'])* | S* )* S* '>'
```

---

```
MFormStart ::= S* '<' 'FORM' S+ NAME_ATTRIB S* LABEL_ATTRIB S* X_ATTRIB S*
               Y_ATTRIB S* HGHT_ATTRIB S* WDTH_ATTRIB (S* SAVE_ATTRIB)?
               (S* MENU_ATTRIB)? (S* MoDAL_ATTRIB)? (S* USBLE_ATTRIB)?
               (S* HLP_ATTRIB)? S* '>'
MFormBody  ::= ( MTxt* | MBttn* | MChkBx* | MChkBxGrp* | MLbl* | MLst* |
                 MPopUp* )*
MFormEnd   ::= S* '<' '\' 'FORM' S* '>'
```

---

```
MTxt  ::= MTxtStart MAction MtxtEnd
MBttn ::= MBttnStart MAction MBtnEnd
```

```
MChkBx     ::= MChkBxStart MAction MChkBxEnd
MChkBxGrp  ::= MChkBxGrpStart MChkBx+ MChkBxGrpEnd
MLbl       ::= S* '<' 'LABEL' S+ NAME_ATTRIB S* LABEL_ATTRIB S* X_ATTRIB S*
               Y_ATTRIB S* '></LABEL>'
MLst       ::= MLstSart MAction MLstEnd
MPUStart   ::= MPUStart Mlst? MPUEnd
```
---
```
MTxtStart ::= S* '<' 'TEXTFIELD' S+ NAME_ATRIB S* X_ATTRIB S* Y_ATTRIB S*
              HGHT_ATTRIB S* WDTH_ATTRIB S* MXCHR_ATTRIB (S* SNGL_ATTRIB)?
              (S* USBLE_ATTRIB)? (S* EDIT_ATTRIB)? (S* ULINE_ATTRIB)?
              (S* ASHFT_ATRIB)? (S* SBAR_ATRIB)? (S* NUM-ATTRIB)? S* '>'
MTxtEnd   ::= S* '<' '\' 'TEXTFIELD' S* '>'
```
---
```
MBttnStart ::= S* '<' 'BUTTON' S+ NAME_ATTRIB S* LABEL_ATTRIB S* X_ATTRIB S*
               Y_ATTRIB (S* USBLE_ATTRIB)? S* '>'
MBttnEnd   ::= S* '<' '\' 'BUTTON' S* '>'
```
---
```
MChkBxStart ::= S* '<' 'CHECKBOX' S+ NAME_ATTRIB S* LABEL_ATTRIB S* X_ATTRIB S*
                Y_ATTRIB S* SELCT_ATTRIB (S* USBL_ATTRIB)? S* '>'
MChkBxEnd   ::= S* '<' '\' 'CHECKBOX' S* '>'
```
---
```
MChkBxGrpStart ::= S* '<' 'CHECKBOXGROUP' S+ NAME_ATTRIB S* '>'
MChkBxGrpEnd   ::= S* '<' '\' 'CHECKBOXGROUP' S* '>'
```
---
```
MLstStart ::= S* '<' 'LIST' S+ NAME_ATTRIB S* X_ATTRIB S* Y_ATTRIB S* HGHT_ATTRIB
              S* WDTH_ATTRIB S* ROW_ATTRIB (S* VWROW_ATTRIB)? (S* USBL_ATTRIB)?
              S* '>'
MLstEnd   ::= S* '<' '\' 'LIST' S* '>'
```
---
```
MPUStart ::= S* '<' 'POPUP' S+ NAME_ATTRIB S* LABEL_ATTRIB S* X_ATTRIB S*
             Y_ATTRIB
```

```
              (S* USBL_ATTRIB)? 'S*' '>'
MPUEnd    ::= S* '<' '\' 'POPUP' S* '>'

------------------------------------------------------------------

MMenuStart ::= S* '<' 'MENU' S* NAME_ATTRIB S* '>'
       MMenuBody  ::= MSubMnu S* MSubMnu*
       MMenuEnd   ::= S* '<' '\' 'MENU' S* '>'

------------------------------------------------------------------

MSubMenu   ::= MSubMnuStart MItem S* MSubMnuBody* MSubMnuEnd

------------------------------------------------------------------

MSubMnuStart ::= S* '<' 'SUBMENU' S+ LABEL_ATTRIB '>'
       MSubMnuBody  ::= MItem | MSeparator
       MSubMnuEnd   ::= S* '<' '\' 'SUBMENU' S* '>'

------------------------------------------------------------------

MItem      ::= S* MItemStart MAction+ MItemEnd
       MSeparator ::= S* '<''SEPARATOR' S* '></SEPARATOR>'

------------------------------------------------------------------

MItemStart ::= S* '<' 'ITEM' S+ LABEL_ATTRIB S* '>'
       MItemEnd   ::= S* '<' '\' 'ITEM' S* '>'

------------------------------------------------------------------

MAction ::= ......

------------------------------------------------------------------

NAME_ATTRIB  ::= 'name' S* EQ S* STRING
       OWNER_ATTRIB ::= 'owner' S* EQ S* STRING
       LABEL_ATTRIB ::= 'label' S* EQ S* STRING
       X_ATTRIB     ::= 'x' S* EQ S* NUM_STR
       Y_ATTRIB     ::= 'y' S* EQ S* NUM_STR
       HGHT_ATTRIB  ::= 'height' S* EQ S* NUM_STR
       WDTH_ATTRIB  ::= 'width' S* EQ S* NUM_STR
       SAVE_ATTRIB  ::= 'savebehind' S* EQ S* BOOL_STR
       MENU_ATTRIB  ::= 'menu' S* EQ S* STRING
```

```
MoDAL_ATTRIB  ::= 'MoDAL' S* EQ S* BOOL_STR
USBLE_ATTRIB  ::= 'usable' S* EQ S* BOOL_STR
HLP_ATTRIB    ::= 'help' S* EQ S* STRING
MXCHR_ATTRIB  ::= 'maxchars' S* EQ S* NUM_STR
SNGL_ATTRIB   ::= 'singleline' S* EQ S* BOOL_STR
EDIT_ATTRIB   ::= 'editable' S* EQ S* BOOL_STR
ULINE_ATTRIB  ::= 'underline' S* EQ S* BOOL_STR
ASHFT_ATTRIB  ::= 'autoshift' S* EQ S* BOOL_STR
SBAR_ATTRIB   ::= 'scrollbar' S* EQ S* BOOL_STR
NUM_ATRIB     ::= 'numeric' S* EQ S* BOOL_STR
SELCT_ATTRIB  ::= 'selected' S* EQ S* BOOL_STR
ROW_ATTRIB    ::= 'rows' S* EQ S* NUM_STR
VWROW_ATTRIB  ::= 'visiblerows' S* EQ S* NUM_STR
```

---

```
S         ::= ( #0xA | #0xD | #0x9 | #0x20 )+
EQ        ::= '='
TAG       ::= Char+ -[^( RSRVWORD | S | '"' )]
Char      ::= S | [ #0x21 - #0x7E ]
STRING    ::= '"' (Char - [^"])* '"'
RSRVWORD  ::= 'APPLICATION' | 'HELP' | '--' | 'FORM' | 'MENU' |
              'SUBMENU' | 'SEPARATOR' | 'ITEM' | 'ACTION' | 'KEYWORD' |
              'GRAFFITI' | '!' | '<' | '>' | '\' | 'TEXTFIELD' |
              'BUTTON' | 'CHECKBOX' | 'CHECKBOXGROUP' | 'LABEL' | 'LIST'
              'POPUP' | 'DBREAD' | 'RECORD' | 'GET' | 'FIELD' |
              'DBWRITE' | 'DBDELETE' | 'ELEMENT' | 'TQUERY' | 'SET'
              'STRING' | 'TSEND' | 'FORMGOTO' | 'DATE' | 'TIME' | 'INT'
              'FLOAT' | 'CHAR' | 'APPSTOP'
BOOL_STR  ::= '"true"' | '"false"'
NUM_STR   ::= '"' [ #0x30 - #0x39 ]+ '"'
```

ADDITIONAL/ALTERNATIVE MoDAL GRAMMAR:

```
MoDAL ::= MComent_Statement* MStart_Statement MBody MEnd_Statement EOF
```

---

```
MComent_Statement ::= S* '<' '!' '--' ( (Char - '-') | ('-' - (Char -
                      '-')))*
                      '--' '>'
MStart_Statement  ::= S* '<' 'APPLICATION' S+ NAME_ATTRIB (S*
                      OWNER_ATTRIB)?
```

```
                        S* '>'
MBody           ::= MForm ( MForm* | MMenu* | MHelp* | MIgnor* )*
                    [VC: It should be a form.name = 'main']
MEnd_Statement  ::= S* '<' '/' 'APPLICATION' S* '>'

-------------------------------------------------------------------------

MForm   ::= MFormStart MFormBody MFormEnd
MMenu   ::= MMenuStart MMenuBody MMenuEnd
MHelp   ::= S* '<' 'HELP' S+ NAME_ATTRIB S* LABEL_ATTRIB S* '/' '>'
MIgnor  ::= '<' TAG S+ ( (Char-[^'>']))* | S* )* S* '>'

-------------------------------------------------------------------------

MFormStart ::= S* '<' 'FORM' S+ NAME_ATTRIB S* LABEL_ATTRIB S* X_ATTRIB S*
               Y_ATTRIB S* HGHT_ATTRIB S* WDTH_ATTRIB (S* SAVE_ATTRIB)?
               (S* MENU_ATTRIB)? (S* MoDAL_ATTRIB)? (S* USBLE_ATTRIB)?
               (S* HLP_ATTRIB)? S* '>'
MFormBody  ::= MFrmInit? ( MTxt* | MBttn* | MChkBx* | MChkBxGrp* | MLbl* |
               MLst* | MPopUp* )*
MFormEnd   ::= S* '<' '/' 'FORM' S* '>'

-------------------------------------------------------------------------

MFrmInit  ::= MFrmInitStart MFrmInitBody MFrmInitEnd
MTxt      ::= MTxtStart MAction MtxtEnd
MBttn     ::= MBttnStart MAction MBtnEnd
MChkBx    ::= MChkBxStart MAction MChkBxEnd
MChkBxGrp ::= MChkBxGrpStart MChkBx+ MChkBxGrpEnd
MLbl      ::= S* '<' 'LABEL' S+ NAME_ATTRIB S* LABEL_ATTRIB S* X_ATTRIB S*
              Y_ATTRIB S* '/' '>'
MLst      ::= MLstSart MAction MLstEnd
MPUStart  ::= MPUStart Mlst? MPUEnd

-------------------------------------------------------------------------

MFrmInitStart ::= S* '<' 'APPINIT' S* '>'
MFrmInitBody  ::= MAction+
MFrmInitEnd   ::= S* '<' '/' 'APPINIT' S* '>'

-------------------------------------------------------------------------

MTxtStart ::= S* '<' 'TEXTFIELD' S+ NAME_ATRIB S* X_ATTRIB S* Y_ATTRIB S*
              HGHT_ATTRIB S* WDTH_ATTRIB S* MXCHR_ATTRIB (S* SNGL_ATTRIB)?
              (S* USBLE_ATTRIB)? (S* EDIT_ATTRIB)? (S* ULINE_ATTRIB)?
```

```
             (S* ASHFT_ATRIB)? (S* SBAR_ATRIB)? (S* NUM-ATTRIB)? S* '>'
MTxtEnd   ::= S* '<' '/' 'TEXTFIELD' S* '>'

-------------------------------------------------------------------------

MBttnStart ::= S* '<' 'BUTTON' S+ NAME_ATTRIB S* LABEL_ATTRIB S* X_ATTRIB
          S*
             Y_ATTRIB (S* USBLE_ATTRIB)? S* '>'
MBttnEnd  ::= S* '<' '/' 'BUTTON' S* '>'

-------------------------------------------------------------------------

MChkBxStart ::= S* '<' 'CHECKBOX' S+ NAME_ATTRIB S* LABEL_ATTRIB S*
          X_ATTRIB S*
             Y_ATTRIB S* SELCT_ATTRIB (S* USBL_ATTRIB)? S* '>'
MChkBxEnd   ::= S* '<' '/' 'CHECKBOX' S* '>'

-------------------------------------------------------------------------

MChkBxGrpStart ::= S* '<' 'CHECKBOXGROUP' S+ NAME_ATTRIB S* '>'
MChkBxGrpEnd   ::= S* '<' '/' 'CHECKBOXGROUP' S* '>'

-------------------------------------------------------------------------

MLstStart ::= S* '<' 'LIST' S+ NAME_ATTRIB S* X_ATTRIB S* Y_ATTRIB S*
HGHT_ATTRIB
          S* WDTH_ATTRIB S* ROW_ATTRIB (S* VWROW_ATTRIB)? (S*
USBL_ATTRIB)?
             S* '>'
MLstEnd   ::= S* '<' '/' 'LIST' S* '>'

-------------------------------------------------------------------------

MPUStart ::= S* '<' 'POPUP' S+ NAME_ATTRIB S* LABEL_ATTRIB S* X_ATTRIB S*
          Y_ATTRIB
             (S* USBL_ATTRIB)? 'S*' '>'
MPUEnd   ::= S* '<' '/' 'POPUP' S* '>'

-------------------------------------------------------------------------

MMenuStart ::= S* '<' 'MENU' S* NAME_ATTRIB S* '>'
MMenuBody  ::= MSubMnu MSubMnu*
MMenuEnd   ::= S* '<' '/' 'MENU' S* '>'
```

```
          ------------------------------------------------------------------

MSubMenu    ::= S* MSubMnuStart MItem MSubMnuBody* MKeyBoard? MGraffit?
                          MSubMnuEnd

------------------------------------------------------------------

5         MSubMnuStart ::= S* '<' 'SUBMENU' S+ LABEL_ATTRIB '>'
          MSubMnuBody  ::= S* ( MItem | MSeparator )
          MSubMnuEnd   ::= S* '<' '/' 'SUBMENU' S* '>'

------------------------------------------------------------------

MItem      ::= S* MItemStart MAction+ MItemEnd
10        MSeparator ::= S* '<' 'SEPARATOR' S* '/' '>'

------------------------------------------------------------------

MItemStart ::= S* '<' 'ITEM' S+ LABEL_ATTRIB S* '>'
          MItemEnd   ::= S* '<' '/' 'ITEM' S* '>'

------------------------------------------------------------------

15        MKeyBoard ::= S* '<' 'KEYBOARD' S* '/' '>'

------------------------------------------------------------------

MGraffit ::= S* '<' 'GRAFFITI' S* '/' '>'

------------------------------------------------------------------

MAction ::= MDBDefine | MDBRead | MDBWrite | MDBDelete | MTQuery | MTSend |
20                    MTReceive | MFrmGto | MSet | MAppStop

------------------------------------------------------------------

MDBDefine ::= MDBDefineStart MDBDefineBody MDBDefineEnd
          MDBRead   ::= S* '<' 'DBREAD' S+ NAME_ATTRIB S* RECORD_ATTRIB? S* '/' '>'
          MDBWrite  ::= S* '<' 'DBWRITE' S+ NAME_ATTRIB S* '/' '>'
25        MDBDelete ::= S* '<' 'DBDELETE' S+ NAME_ATTRIB S* RECORD_ATTRIB? S* '/' '>'
          MTQuery   ::=                       [C: To be defined....]
          MTSend    ::=                       [C: To be defined....]
          MTReceive ::=                       [C: To be defined....]
          MFrmGto   ::= S* '<' 'FORMGOTO' S+ NAME_ATTRIB '/' '>'
```

```
         MSet       ::= MSetStart MSetBody MSetEnd
         MAppStop  ::= S* '<' 'APPSTOP' S* '/' '>'

------------------------------------------------------------------------

MDBDefineStart ::= S* '<' 'DBDEFINE' S+ NAME_ATTRIB S* '>'
   5     MDBDefineBody  ::= MField+
         MDBDefineEnd   ::= S* '<' '/' 'DEBDEFINE' S* '>'

------------------------------------------------------------------------

MField ::= S* '<' 'FIELD' S+ NAME_ATTRIB S* CLASS_ATTRIB S* '/' '>'

------------------------------------------------------------------------

10     MSetStart ::= S* '<' 'SET' S+ NAME_ATTRIB S* '>'
         MSetBody  ::= MAttrib+
         MSetEnd   ::= S* '<' '/' 'SET' S* '>'

------------------------------------------------------------------------

MAttrib ::= S* '<' 'ATTRIB' S+ NAME_ATTRIB S* VALUE_ATTRIB S* '/' '>'

15     ------------------------------------------------------------------------

NAME_ATTRIB   ::= 'name' S* EQ S* STRING
         OWNER_ATTRIB  ::= 'owner' S* EQ S* STRING
         LABEL_ATTRIB  ::= 'label' S* EQ S* STRING
         X_ATTRIB      ::= 'x' S* EQ S* NUM_STR
  20     Y_ATTRIB      ::= 'y' S* EQ S* NUM_STR
         HGHT_ATTRIB   ::= 'height' S* EQ S* NUM_STR
         WDTH_ATTRIB   ::= 'width' S* EQ S* NUM_STR
         SAVE_ATTRIB   ::= 'savebehind' S* EQ S* BOOL_STR
         MENU_ATTRIB   ::= 'menu' S* EQ S* STRING
  25     MoDAL_ATTRIB  ::= 'MoDAL' S* EQ S* BOOL_STR
         USBLE_ATTRIB  ::= 'usable' S* EQ S* BOOL_STR
         HLP_ATTRIB    ::= 'help' S* EQ S* STRING
         MXCHR_ATTRIB  ::= 'maxchars' S* EQ S* NUM_STR
         SNGL_ATTRIB   ::= 'singleline' S* EQ S* BOOL_STR
  30     EDIT_ATTRIB   ::= 'editable' S* EQ S* BOOL_STR
         ULINE_ATTRIB  ::= 'underline' S* EQ S* BOOL_STR
         ASHFT_ATTRIB  ::= 'autoshift' S* EQ S* BOOL_STR
         SBAR_ATTRIB   ::= 'scrollbar' S* EQ S* BOOL_STR
         NUM_ATRIB     ::= 'numeric' S* EQ S* BOOL_STR
```

```
       SELCT_ATTRIB   ::= 'selected' S* EQ S* BOOL_STR
       ROW_ATTRIB     ::= 'rows' S* EQ S* NUM_STR
       VWROW_ATTRIB   ::= 'visiblerows' S* EQ S* NUM_STR
       RECORD_ATTRIB  ::= 'record' S* EQ S* NUM_STR
  5    CLASS_ATTRIB   ::= 'class' S* EQ S* STRING
       VALUE_ATTRIB   ::= 'value' S* EQ S* STRING

----------------------------------------------------------------------

S              ::= ( #0xA ¦ #0xD ¦ #0x9 ¦ #0x20 )+
       EQ             ::= '='
  10   TAG            ::= Char+ -[^( RSRVWORD ¦ S ¦ '"' )]
       Char           ::= S ¦ [ #0x21 - #0x7E ]
       STRING         ::= '"' (Char - [^"])* '"'
       RSRVWORD       ::= 'APPLICATION' ¦ 'HELP' ¦ '--" ¦ 'FORM' ¦ 'MENU' ¦
                          'SUBMENU' ¦ 'SEPARATOR' ¦ 'ITEM' ¦ 'ACTION' ¦
  15   'KEYWORD' ¦
                          'GRAFFITI' ¦ '!' ¦ '<' ¦ '>' ¦ '/' ¦ 'TEXTFIELD' ¦
                          'BUTTON' ¦ 'CHECKBOX' ¦ 'CHECKBOXGROUP' ¦ 'LABEL' ¦
       'LIST'
                          'POPUP' ¦ 'DBREAD' ¦ 'RECORD' ¦ 'FIELD' ¦ 'DBINIT'
  20                      'DBWRITE' ¦ 'DBDELETE' ¦ 'ELEMENT' ¦ 'TQUERY' ¦ 'SET'
                          'STRING' ¦ 'TSEND' ¦ 'FORMGOTO' ¦ 'DATE' ¦ 'TIME' ¦
       'INT'
                          'FLOAT' ¦ 'CHAR' ¦ 'APPSTOP' ¦ 'APPINIT' ¦ 'TRECEIVE'
                          'ATTRIB'
  25   BOOL_STR       ::= '"true"' ¦ '"false"'
       NUM_STR        ::= '"' [ #0x30 - #0x39 ]+ '"'
```

While the particular UNIVERSAL INFORMATION APPLIANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. An information appliance including a display and at least one input device, comprising:
   an application source;
   a parser receiving applications from the application source, the input device being manipulable to cause an application from the source to be sent to the parser, the parser transforming the application into at least a list of graphical user interface (GUI) elements associated with the application and a list of elements associated with the application, such that the list of GUI elements is made dynamically; and
   a universal information appliance (UIA) engine accessing the lists to execute the application.

2. The information appliance of claim 1, wherein the UIA engine includes a UIA processor for executing the application and a UIA communication manager communicating data between the UIA processor and one or more globally shared, associatively addressed memory spaces.

3. The information appliance of claim 2, further comprising a local data cache, wherein the UIA communication manager communicates with the local data cache when the information appliance is not communicating with a globally shared, associatively addressed memory space.

4. A computer-implemented method for executing an application, comprising:
   receiving the application;
   processing the application to identify graphical user interface (GUI) establishing instructions therein and to separate application instructions therefrom; and
   dynamically rendering a graphical user interface (GUI) based on the GUI establishing instructions and executing the application based on the application instructions.

5. The method of claim 4, wherein the processing is undertaken by a parser in an information appliance, the rendering is undertaken by a universal information application (UIA) engine in the information appliance, and the GUI is rendered on a display associated with the information appliance.

6. The method of claim 5, wherein the parser transforms the application into at least a list of graphical user interface (GUI) elements associated with the application and a list of elements associated with the application, such that the list of GUI elements is made dynamically, wherein the UIA engine accesses the lists to execute the application.

7. The method of claim 6, wherein the UIA engine includes a UIA processor for executing the application and a UIA communication manager communicating data between the UIA processor and one or more globally shared, associatively addressed memory spaces.

8. The method of claim 7, wherein the information appliance includes a local data cache, and wherein the UIA communication manager communicates with the local data cache when the information appliance is not communicating with a globally shared, associatively addressed memory space.

9. An information appliance including a display and at least one input device, comprising:
   an application source;
   a parser receiving applications from the application source, the input device being manipulable to cause an application from the source to be sent to the parser, the parser transforming the application into at least a list of graphical user interface (GUI) elements associated with the application and a list of elements associated with the application, such that the list of GUI elements is made dynamically;
   a universal information appliance (UIA) engine accessing the lists to execute the application, wherein the UIA engine includes a UIA processor for executing the application and a UIA communication manager communicating data between the UIA processor and one or more globally shared, associatively addressed memory spaces, the communication manager communicating with a proxy for converting data from the UIA processor to tuples for use of the tuples by one or more of the globally shared, associatively addressed memory spaces, the proxy converting tuples from the globally shared, associatively addressed memory spaces to data usable by the UIA processor.

10. An information appliance including a display and at least one input device, comprising:
    an application source;
    a parser receiving applications from the application source, the input device being manipulable to cause an application from the source to be sent to the parser, the parser transforming the application into at least a list of graphical user interface (GUI) elements associated with the application and a list of elements associated with the application, such that the list of GUI elements is made dynamically;
    a universal information appliance (UIA) engine accessing the lists to execute the application, wherein the application is written in MoDAL language, and the parser converts the MoDAL language of the application to binary language.

11. The information appliance of claim 10, wherein the MoDAL language includes plural language elements for establishing: GUI elements, action elements at least some of which can be associated with respective GUI elements, and MoDAL elements at least some of which can be associated with respective action elements and respective GUI elements.

12. The information appliance of claim 11, wherein the GUI elements are selected from the group of elements including one or more of forms, buttons, fields, lists, pop up triggers, menus, help strings, and tables.

13. The information appliance of claim 11, wherein the action elements are selected from the group of elements including one or more of database read, database write, database delete, tuple send, tuple query, formgoto, appstop, set, get, condition, and date.

14. A computer-implemented method for executing an application, comprising:
    receiving the application at a processor;
    processing the application to identify graphical user interface (GUI) establishing instructions therein;
    communicating with a proxy for converting data to tuples;
    sending the tuples to one or more of the globally shared, associatively addressed memory spaces;

converting tuples from the globally shared, associatively addressed memory spaces to data usable by the processor; and dynamically rendering a graphical user interface (GUI) based on the GUI establishing instructions.

15. A computer-implemented method for executing a MoDAL application, comprising:

receiving the application at a processor;

converting the MoDAL language of the application to binary language;

processing the application to identify graphical user interface (GUI) establishing instructions therein; and dynamically rendering a graphical user interface (GUI) based on the GUI establishing instructions.

16. The method of claim 15, wherein the MoDAL language includes plural language elements for establishing: GUI elements, action elements at least some of which can be associated with respective GUI elements, and MoDAL elements at least some of which can be associated with respective action elements and respective GUI elements.

17. The method of claim 16, wherein the GUI elements are selected from the group of elements including one or more of forms, buttons, fields, lists, pop up triggers, menus, help strings, and tables.

18. The method of claim 16, wherein the action elements are selected from the group of elements including one or more of database read, database write, database delete, tuple send, tuple query, formgoto, appstop, set, get, condition, and date.

19. A computer program product comprising:

a computer program storage device readable by an information appliance; and a program means on the program storage device and including program code elements embodying instructions executable by the information appliance for performing method steps for dynamically rendering a graphical user interface (GUI) on a display associated with the information appliance, the method steps comprising:

converting at least one application written in MoDAL language to a binary format for executing the application;

rendering the GUI on the display based on the binary format.

20. A computer program product comprising:

a computer program storage device readable by an information appliance; and a program means on the program storage device and including program code elements embodying instructions executable by the information appliance for performing method steps for dynamically rendering a graphical user interface (GUI) on a display associated with the information appliance, the method steps comprising:

converting at least one application written in a language to a binary format for executing the application;

rendering the GUI on the display based on the binary format, wherein the language includes plural language elements for establishing: GUI elements, action elements at least some of which can be associated with respective GUI elements, and MoDAL elements at least some of which can be associated with respective action elements and respective GUI elements.

21. The computer program product of claim 20, wherein the GUI elements are selected from the group of elements including one or more of forms, buttons, fields, lists, pop up triggers, menus, help strings, and tables.

22. The computer program product of claim 20, wherein the action elements are selected from the group of elements including one or more of database read, database write, database delete, tuple send, tuple query, formgoto, appstop, set, get, condition, and date.

* * * * *